United States Patent [19]

Yano et al.

[11] E Patent Number: Re. 32,030

[45] Reissued Date of Patent: Nov. 12, 1985

[54] CLOSED LOOP CONTROLLED AUXILIARY AIR DELIVERY SYSTEM FOR INTERNAL COMBUSTION ENGINE

[75] Inventors: Tsuneomi Yano, Tokyo; Haruo Yuzawa, Yokohama, both of Japan

[73] Assignee: Nissan Motor Company, Limited, Yokohama, Japan

[21] Appl. No.: 416,162

[22] Filed: Sep. 9, 1982

Related U.S. Patent Documents

Reissue of:

[64] Patent No.: 4,240,145
Issued: Dec. 16, 1980
Appl. No.: 965,467
Filed: Nov. 30, 1978

[30] Foreign Application Priority Data

Dec. 1, 1977 [JP] Japan ..... 52-143309
Dec. 1, 1977 [JP] Japan ..... 52-143310

[51] Int. Cl.[4] ..... G06F 7/70; F02M 23/06; F02M 23/08

[52] U.S. Cl. ..... 364/431.04; 123/327; 123/339; 123/585; 123/587; 364/431.07

[58] Field of Search ..... 123/327, 339, 340, 352, 123/492, 570, 588, 589; 364/431.04, 431.05, 431.06

[56] References Cited

U.S. PATENT DOCUMENTS

| | | | |
|---|---|---|---|
| 3,103,128 | 9/1981 | Gordon | 123/339 X |
| 3,146,844 | 9/1964 | Carlson | 123/339 X |
| 3,252,539 | 5/1966 | Mundelein | 123/339 X |
| 3,253,774 | 5/1966 | Dietrich | 123/339 X |
| 3,724,230 | 4/1973 | Muto et al. | 123/351 X |
| 3,964,457 | 6/1976 | Coscia | 123/339 X |
| 4,079,711 | 3/1978 | Hattori et al. | 123/589 |
| 4,084,558 | 4/1978 | Hattori et al. | 123/327 |
| 4,084,563 | 4/1978 | Hattori et al. | 123/589 |
| 4,108,127 | 8/1978 | Chapin et al. | 123/339 X |
| 4,146,000 | 3/1979 | Hattori et al. | 123/589 X |
| 4,161,928 | 7/1979 | Teague et al. | 123/339 X |
| 4,163,282 | 7/1979 | Yamada et al. | 123/570 X |
| 4,164,914 | 8/1979 | Hattori et al. | 123/588 |
| 4,173,957 | 11/1979 | Hattori et al. | 123/589 |
| 4,181,104 | 1/1980 | Shinoda | 123/352 X |
| 4,191,051 | 3/1980 | Kawata et al. | 123/340 X |
| 4,203,395 | 5/1980 | Cromas et al. | 123/339 |
| 4,216,938 | 8/1980 | Inada et al. | 123/339 X |
| 4,227,507 | 10/1980 | Takase et al. | 123/492 |
| 4,289,100 | 9/1981 | Kinugawa et al. | 123/339 |

FOREIGN PATENT DOCUMENTS

| | | |
|---|---|---|
| 2523283 | 1/1976 | Fed. Rep. of Germany . |
| 48-21032 | 3/1973 | Japan . |
| 49-53118 | 5/1974 | Japan . |
| 50-48024 | 5/1975 | Japan . |
| 51-23435 | 10/1976 | Japan . |

*Primary Examiner*—Felix D. Gruber
*Attorney, Agent, or Firm*—Schwartz, Jeffery, Schwaab, Mack, Blumenthal & Evans

[57] ABSTRACT

An auxiliary air delivery system for an internal combustion engine includes an intake vacuum sensor for generating an intake vacuum signal, a deceleration sensor and a microcomputer in which is stored a set of data representing different values of reference intake vacuum and programmed to retrieve a datum as a function of the length of time from the occurrence of engine deceleration. The retrieved information is used a reference signal with which the intake vacuum signal is compared to provide a control signal. A servo mechanism is provided to allow auxiliary air to be admitted into the manifold at a point downstream of the nearly closed throttle in response to the control signal to reduce the difference between the actual intake vacuum and the reference intake vacuum.

14 Claims, 9 Drawing Figures

1
AIR CONDITIONER OPERATED ?
107
OFF
ON
PULSE WIDTH P(C) = 0
PULSE WIDTH P(C) = C 1
LOCATE CORRESPONDING ENGINE RPM DATA (NM)
114
LOCATE CORRESPONDING ENGINE RPM DATA (NM)
115
116
N-NM > C2
YES
NO
NM N > C2
YES
NO
PN 1 = 0
PN 2 = PN 2+1
PN 2 = 0
PN 1 = PN+1
PN2 ≥ C3
NO
NO
PN 1 ≥ C3
YES
YES
PN 2=0
ΔP = ΔP+1
PN 1 = 0
ΔP = ΔP-1
2

3
109
N < 3000
NO
YES
110
TOP GEAR ?
YES
NO
111
15°C < Tw < 95°C
NO
YES
LOCATE DATA ON MAXIMUM INTAKE VACUUM Vc max AS A FUNCTION OF TIME FROM START OF DECELERATION
112
113
Vc−Vc max
−
+
0
ΔPV = ΔPV − 1
ΔPV = ΔPV + 1
6
TO Fig. 3D
4

CLOSED LOOP CONTROLLED AUXILIARY AIR DELIVERY SYSTEM FOR INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

The present invention relates to a method and a system for maintaining the intake vacuum of an internal combustion engine at a predetermined reference value when the engine is decelerated.

Under decelerating condition of an internal combustion engine, air supply to the engine is insufficient to maintain air-fuel ratio at the stoichiometric point of the mixture, thereby resulting in the emission of high content hydrocarbon.

Various devices have hitherto been developed to mitigate this problem. These include throttle opener, throttle positioner and boost controlled deceleration device (BCDD). The latter has a valve controlled throttle bypass air passage which admits auxiliary air into the manifold at a point downstream of the closed throttle.

For purposes of reducing the undesirable emission, it is desirable that the intake vacuum be relatively low during the initial period of deceleration. Conversely, during the subsequent period of deceleration a relatively high value of intake vacuum is desirable to operate the engine as a brake. During the later period when the engine is idled, it is further desirable that the intake vacuum be lower than that during the initial deceleration period. It is impossible for the prior art devices to meet these requirements accurately.

SUMMARY OF THE INVENTION

The invention is a closed loop electronic auxiliary air delivery system to accurately provide auxiliary air to an internal combustion engine in order to minimize undesirable emissions and assure engine brake operation when the engine is decelerated.

The system of the invention comprises a microcomputer in which is stored a set of data representing different values of reference or optimum intake vacuum which are experimentally determined as a function of time from the occurrence of deceleration, an intake vacuum sensor for generating an intake vacuum signal indicative of the actual intake vacuum and an air delivery servo mechanism. The microcomputer is in receipt of the intake vacuum signal for comparison with a reference signal retrieved from the stored data to generate a control signal to which the servo mechanism is responsive to allow auxiliary air to be admitted into the manifold at a point downstream of the closed throttle valve to reduce the difference between the actual intake vacuum and the reference intake vacuum to zero.

The computer is further provided with another set of stored data which represent reference idle engine speeds as a function of engine temperatures. An engine speed sensor is provided to generate an engine speed signal representative of the actual engine speed and an engine temperature signal indicative of the actual engine temperature. The computer is so programmed as to retrieve the corresponding datum to compare it with the actual engine speed as a function of the actual engine temperature to generate a second control signal which is applied to the servo control mechanism to reduce the difference between the actual and reference idle engine speeds to zero.

The intake vacuum, engine speed and engine temperature signals used in the invention may be the conventional vacuum sensor, speed and temperature sensors embodied in an electronic fuel injection (EFT) control system. However, it may be applied to conventional, non-EFI equipped engines with some modifications.

The object of this invention is to provide an auxiliary air delivery system for controlling the intake vacuum when the throttle is nearly closed.

Another object of the invention is to provide a closed loop controlled auxiliary air delivery system in which the intake vacuum is controlled as a function of time when the engine is decelerated.

A further object of the invention is to provide a closed loop controlled auxiliary air delivery system in which the engine idle speed is controlled as a function of the engine temperature.

BRIEF DESCRIPTION OF THE DRAWINGS

The invention will be further described in detail with reference to the accompanying drawings, in which.

DETAILED DESCRIPTION

Figure 1:
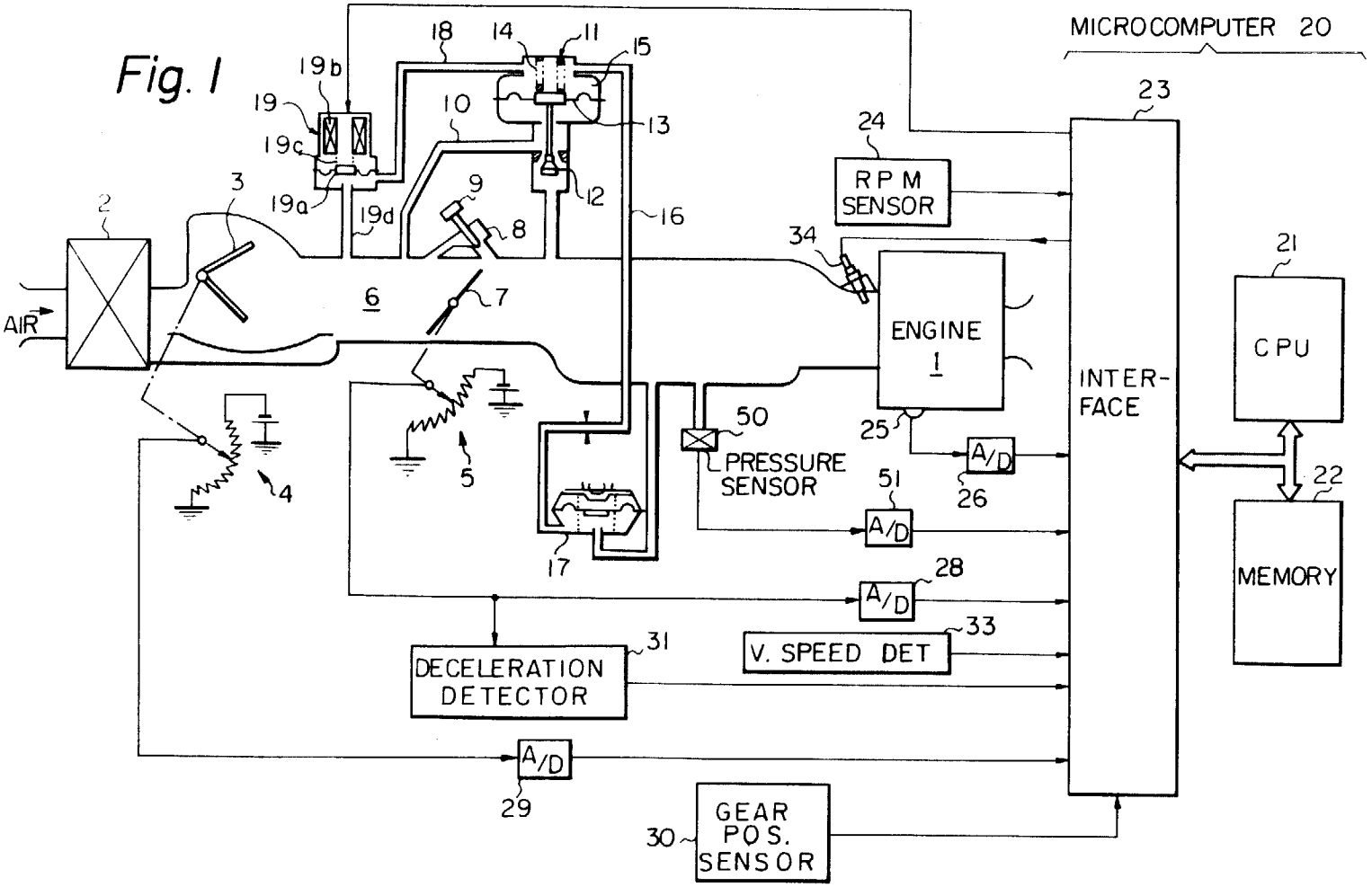
FIG. 1 is a schematic block diagram of the closed loop controlled auxiliary air delivery system of the invention.

Referring now to FIG. 1, an engine control system embodying the invention is illustrated. A flow of air is admitted through air cleaner 2 to the intake manifold 6 in which air flow responsive plates 3 are provided between the air cleaner 2 and the throttle control valve 7. The air flow plates 3 have the transverse axis connected to the slider of an air-flow potentiometer 4 to develop a DC voltage signal in proportion to the angular position of the plate 3 and hence to the quantity of air taken in per unit time. A throttle position sensing potentiometer 5 is provided having its slider linked to the axis of the throttle valve 7 to develop a corresponding DC voltage proportional to the opening angle of the throttle in response to the depression of the accelerator pedal. The voltage signals so developed at the sliders of the potentiometers 4 and 5 are coupled to analog-to-digital converters 28 and 29, respectively, from whence the converted digital signals are applied to the interface 23 of a microcomputer 20. The intake passage 6 serves as a main air intake passage in cooperation with the throttle control valve 7. Additional air is supplied to the engine through an auxiliary air supply system comprised of an auxiliary air passageway 10 formed outside of the main passageway 6 between points upstream and downstream of the throttle valve 7. In the auxiliary air passageway 10 is provided a control valve 11 which includes a valve member 12 forming an orifice with a valve seat adjacent thereto for purposes of controlling air passing through the passage 10 to the downstream side of the throttle valve 7. The valve member 12 is connected with a diaphragm 13 supported by a spring 14 in the valve housing to form a vacuum chamber 15 therein. To the vacuum chamber 15 is connected a vacuum supply conduit 16 leading from a pressure regulator 17 whose inlet port is connected to the intake passage 6 downstream from the control valve 7. Also connected to the vacuum chamber 15 of the control valve 11 is an air supply conduit 18 which leads from a pulse-operated control valve 19. The latter has its normally closed valve member 19a which is supported by a spring 19c and operable to open in response to a pulse supplied to solenoid 19b from the interface 23 of the microcomputer. The control valve 19 has its inlet passage 19d connected to the main intake passageway 6 upstream from the inlet port of the auxiliary air passage 10 to supply a predetermined amount of air to the vacuum chamber 15 of control valve 11 via air passageway 18 in response to the opening of the valve member 19a. Therefore, the vacuum pressure within the vacuum chamber 15 of control valve 11 is controlled in response to the control signal supplied from the microcomputer 20, so that the diaphragm 13 and hence the valve member 12 is positioned to vary the cross-section of the orifice in response to that control signal.

Therefore, the vacuum pressure in the intake manifold 6 downstream from the throttle valve 7 is under the control of the signal from the computer.

A bypassport 8 and an idle adjustment screw 9 are provided in the intake manifold 6 to serve as a bypass air supply passage during idle condition. Fuel supply is provided by means of an injector 34 which is responsive to an output signal from the computer 20. Although electronic fuel injection is disclosed as a means for supplying fuel, the invention can also be applied to carburetted engines.

Figure 2:
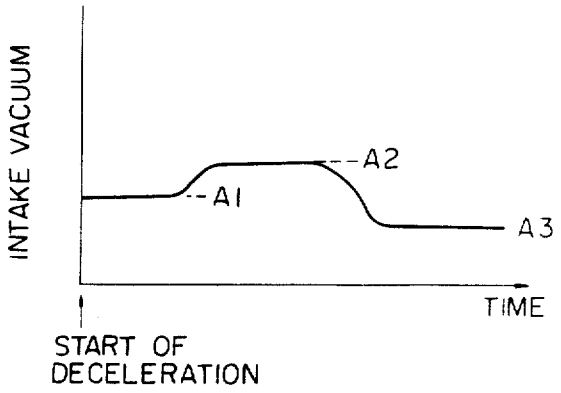
FIG. 2 is a graphic illustration of an operating characteristic of the system of FIG. 1.

The microcomputer 20 is so programmed that it controls in response to signals supplied thereto through the interface 23 the vacuum pressure in the intake manifold as a function of time as illustrated in FIG. 2 when the engine is being decelerated. The central processor unit 21 receives data stored in the memory 22 and signals from the interface 23 and generates instructions to perform various functional steps to derive the control signal.

For purposes of generating the control signal, the interface 23 is in receipt of various digital signals representing engine operating parameters in addition to the signals supplied from the A/D converters 28 and 29. A pressure sensor 50 is provided downstream of the throttle valve 7 to generate a vacuum pressure representative voltage signal which is converted by an A/D converter 51 into a corresponding digital signal. Engine coolant temperature is detected by a temperature sensor 25 whose output voltage signal is converted by an A/D converter 26 and supplied to the computer 20. Engine-speed related pulses are derived from an RPM sensor 24, and a gear position signal is generated at 30.

A deceleration detector 31 is connected to the slider of throttle opening potentiometer 5 to provide an output in the presence of deceleration to the interface 23. Responsive to the output from the detector 31 the central processor 21 starts counting clock pulses to measure the length of time from the occurrence of deceleration to locate relevant data stored in the memory 22 required in the processing of steps which will be described below. In the memory 22 there is stored a set of data, representing maximum allowable intake vacuum pressures, which will be retrieved as a function of time elapsed from the occurrence of engine deceleration (FIG. 2). The retrieved data are compared with the data represented by the signal from the A/D converter 51 in the processor unit 21 which generates a control signal in the form of pulses which control the pulse responsive valve 19 such that the vacuum pressure in the intake manifold may not exceed the retrieved maximum value. More specifically, the microcomputer senses the difference between the actual and reference vacuum representative signals to generate a control signal and reduce the difference between the actual and reference intake vacuum pressures substantialy to zero.

After the description of the hardware construction of the engine control system now follows the description of the software of the microcomputer 20 with reference to flow charts shown in FIGS. 3A to 3E.

Figure 3A:
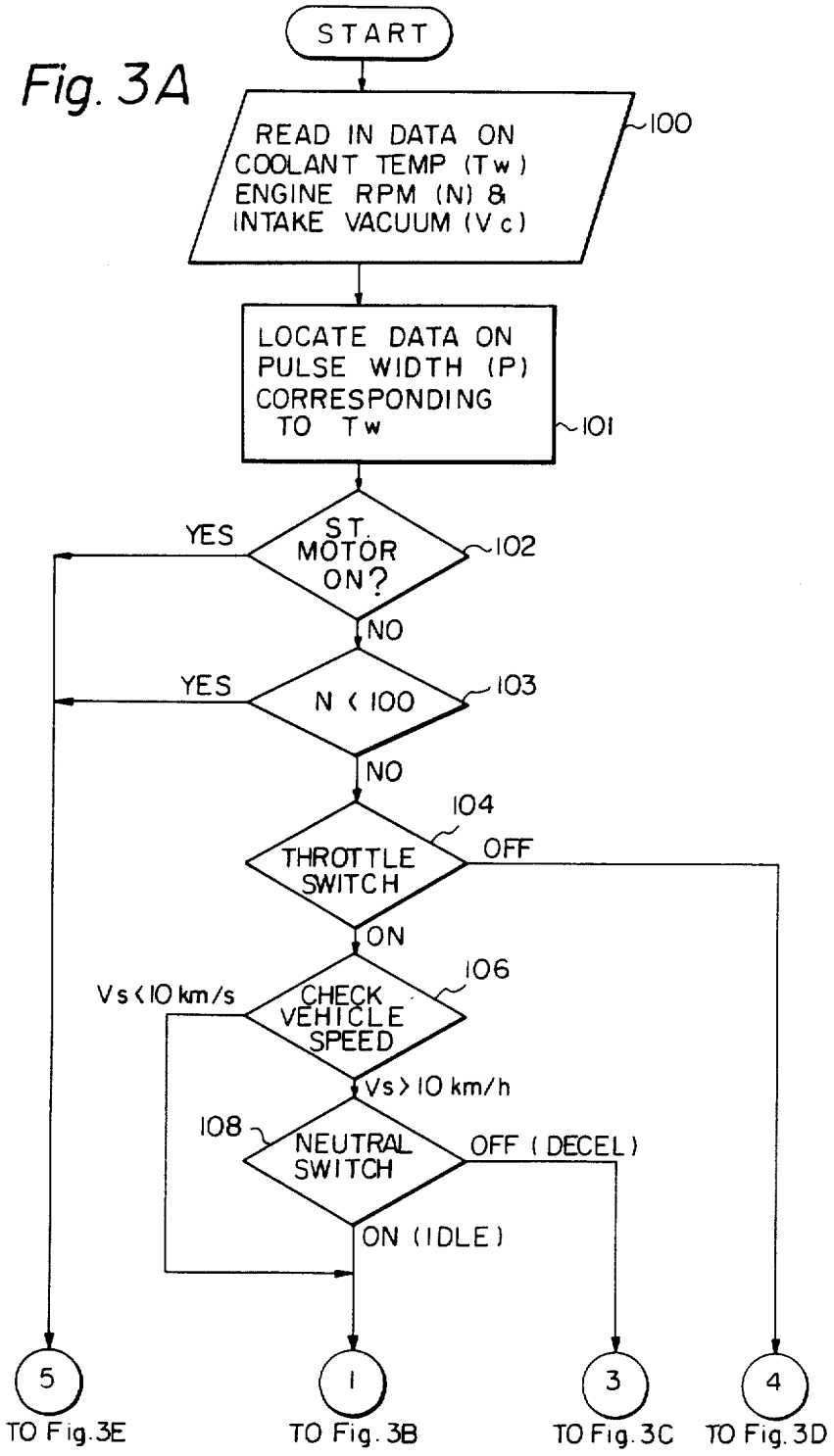
FIGS. 3A to 3E are flow diagrams illustrating the operating process steps of the microcomputer of FIG. 1.

In response to the operation of the ignition key, the central processor 21 receives data indicative of engine temperature (Tw), engine speed (N), intake vacuum (Vc) and other data through the interface 23 in synchronism with each revolution of the engine crankshaft (step 100, FIG. 3A). These read-in data are temporarily stored in the memory unit 22 and updated at each crankshaft revolution.

For a given engine operating temperature there is an optimum open time of the valve 19, and for a range of such temperatures a set of corrective multiplication factors (represented in percentages in digital values) in relation to a reference open time is stored in the memory unit 22. Responsive to the read-in temperature data Tw, the central processor 21 proceeds to step 101 to locate the corresponding corrective pulsewidth multiplication factor and retrieve it from the memory to generate a control pulse. The processor 21 goes to step 102 to check to see if the engine starter motor (not shown) is being energized for cranking operation. If cranking operation is being effected, the control pulse has a reference or standard pulsewidth P(Tw) and if it is detected that the starter motor remains de-energized, the processor goes to the next step 103 to check if the engine speed is above or below a set value of 100 revolutions per minute and if the engine speed is below that value the processor recognizes it as a condition prior to combustion and delivers a standard control pulse P(Tw).

If the engine speed is above 100 RPM, the processor goes to step 104 to check to see if the throttle valve 7 is open or closed. If open, the processor goes to step 128, FIG. 3D, to provide a corrective action by adding a corrective pulsewidth $\Delta P$ to the referece pulsewidth P(Tw). When closed condition of the throttle is detected, that is, the engine is idled or decelerated, the processor proceeds to step 106 to check to see if the vehicle is idled. This is detected by the presence of a signal from a vehicle speed sensor 33 (FIG. 1) which occurs when the vehicle speed is below 10 km/h. In the presence of idle condition, the processor goes to step 107, FIG. 3B. If the vehicle speed is above 10 km/h, the processor goes to step 108 to check to see if the transmission gear shift lever is at the neutral position. If the transmission gear is in the neutral position, the processor receives a signal from the gear position sensor 30 and recognizes it as an idle condition and proceeds to step 107 as referred to above. If it is detected that the gear position is other than the neutral, the processor recognizes it as a decelerating condition and proceeds to step 109, FIG. 3C, to see if the engine speed is above or below a set value of 3000 revolutions per minute. If the engine revolution is below this set value the processor goes to step 110 to determine whether the transmission gear is at the top gear position. If the gear position is not at the top position, then the processor goes to step 111 in which the engine temperature is checked to ascertain if it is within a specified range between 15° C. and 95° C. and if that temperature is within the specified range the processor goes to step 112 to locate the data stored in the memory 22 which indicates the maximum intake vacuum $Vc_{max}$ as a function of time from the start of engine deceleration. In each of the steps 109 to 111 if the detected conditions are different from those described above, the processor will go to step 128, FIG. 3D.

In the memory unit 22 there is stored a set of data representing maximum intake vacuum as a function of time elapsed from the detection of engine deceleration as depicted in FIG. 2. In step 112, the computer 20 counts the elapse of time in response to a signal from the deceleration detector 31 and retrieves the maximum intake vacuum value which corresponds to the counted elapsed time, and compared the retrieved value with the actual vacuum pressure Vc provided by the pressure sensor 50 now temporarily stored in the memory 22 in step 113. If Vc is smaller than $Vc_{max}$, a correction pulsewidth which is equal to 1% less than a standard correction pulsewidth ΔPV is derived so that in the following step 105 the total pulsewidth becomes P(Tw)+0.99ΔPV. Conversely, if Vc is greater than $Vc_{max}$, the total pulsewidth becomes P(Tw)+1.01ΔPV. When Vc equals $Vc_{max}$, the standard correction pulsewidth of ΔPV is added to the standard pulsewidth value. Therefore, the vacuum pressure at a point downstream of the throttle valve 7 is controlled correspondingly with the total pulsewidth of the control signal in a feedback loop so that the vacuum precisely follows the curve shown in FIG. 2.

The standard pulsewidth P(Tw) may be determined so that the vacuum pressure is optimized for idle conditions. Preferably, this standard pulsewidth is determined based on the engine revolution at the instant the deceleration condition is detected.

Figure 3B:
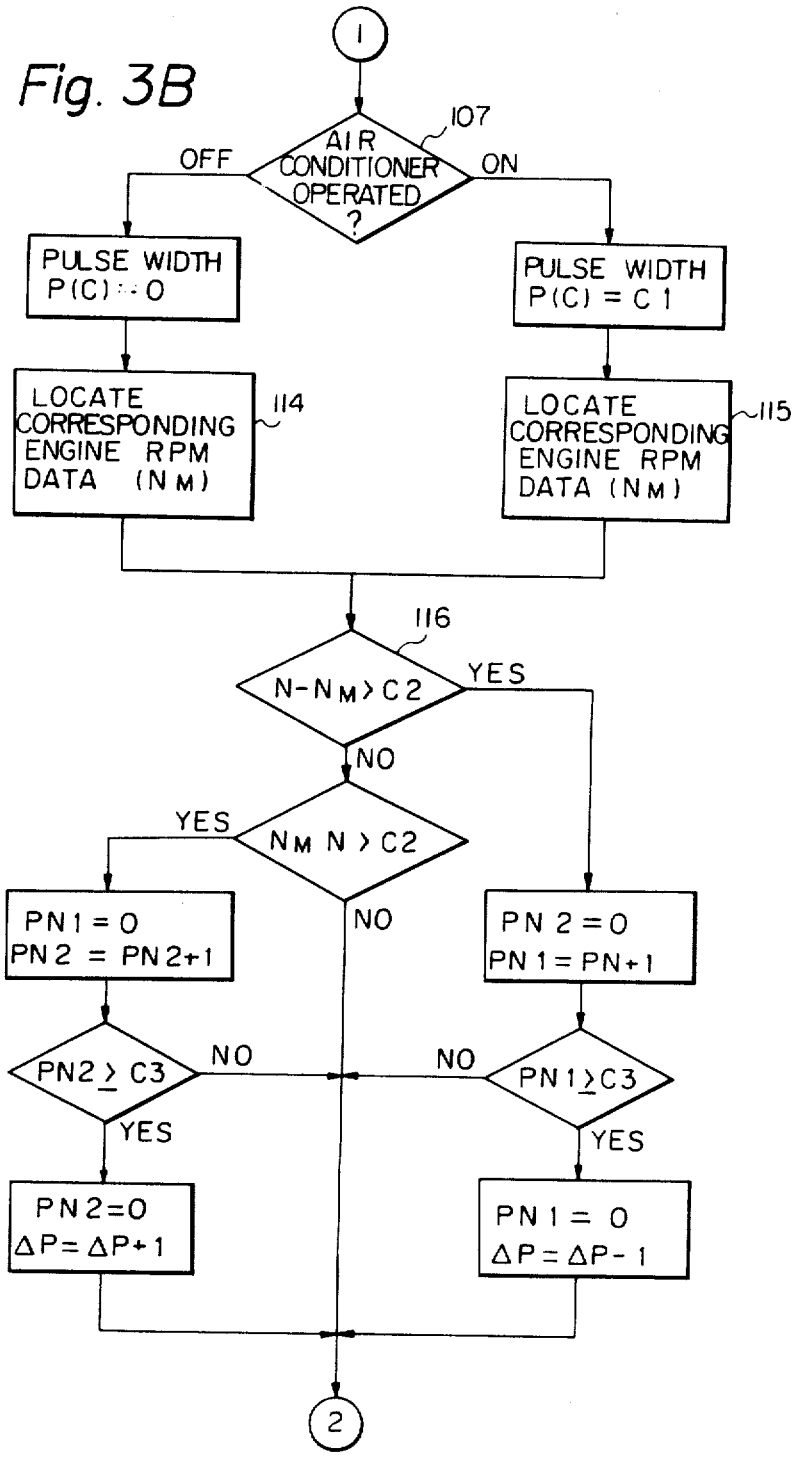

If idle condition is detected in step 106 to 108, the processor will proceed to step 107, FIG. 3B, to check to see if the air conditioner (not shown) is operated and if not operated a correction pulsewidth P(C) is nullified and the processor proceeds to step 114.

Figure 4:
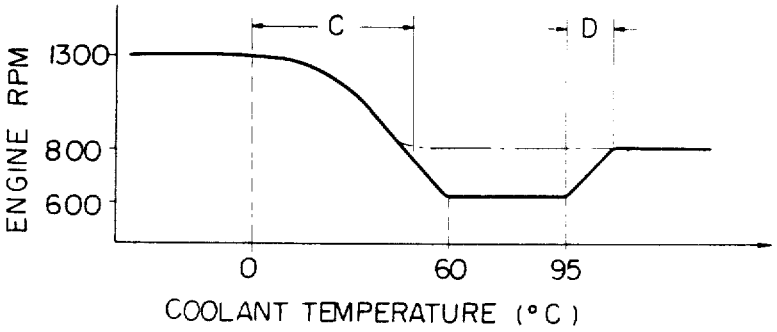
FIG. 4 is a graphic illustration of another operating characteristic of the system of FIG. 1.

In the memory unit 22, there is stored a set of engine revolution data ($N_M$) which correspond to the optimum pulsewidth as a function of coolant temperature as indicated by a solid line curve, FIG. 4, which is determined as an optimum idle engine speed provided that the air conditioner is not operated. Another engine revolution data is stored in the memory unit 22 which corresponds to the optimum pulsewidth as indicated by a chain-dot-line, FIG. 4 for idle conditions with the air conditioner being operated.

In the step 114 (FIG. 3B), the processor attempts to locate the optimum engine revolution data in the memory and retrieve it therefrom as a function of the detected engine temperature. If the air conditioner is detected as being in operation in step 107, the processor determines that the correction pulsewidth P(C)=Cl and then proceeds to step 115 to locate the optimum engine speed data. The correction pulsewidth data will be added to the standard pulsewidth P(Tw) as will be described later to maintain adequate engine speed to prevent engine from stalling and deliver additional engine output power for operating the air conditioner.

After the optimum idle engine rpm $N_M$ has been obtained, a comparison is made between $N_M$ and the actual engine rpm N. In this case, if the absolute value of the difference between $N—N_M$ is equal to or smaller than C2 (where C2 is 25 rpm, for example), the feedback operation is disabled to provide stability to the system. Further, the computer is so programmed that the system does not resume feedback operation even if the absolute value of the difference becomes greater than C2 if such condition exists only for the duration of a single crankshaft revolution. More specifically, the system resumes feedback operation until such conditions subsist for a duration of C3 (five crankshaft revolutions, for example) revolutions in order to prevent the system from oscillating between closed and open loop control modes. Therefore, the computer counts the occurrence of these events. During the counting operation of the event $N—N_M > C2$, *there is a likelihood of the occurrence of the event* $N_M—N > C2$ and if this occurs, the previous counts are cleared to initiate the counting operation of the latter. PN1 and PN2 serve the purpose of the counting operations.

More specifically, if the event that the engine rpm value N is greater than the optimum value $N_M$ (25 rpm) occurs five times, the corrective action is initiated to reduce the corrective pulsewidth ΔP by 1% of its value (where ΔP is initially at zero) with the result that the total pulsewidth is P(Tw)+P(C)+0.99ΔP is obtained so that the amount of air supply is reduced so as to allow the engine to decrease its rpm value. Conversely, if the event that the actual engine rpm N is smaller than $N_M$ occurs five times, the supplied air quantity is increased to allow the engine rpm to increase by increasing the corrective pulsewidth ΔP by 1% of its value with a total of P(Tw)+P(C)+1.01ΔP. If the absolute value of the difference between $N—N_M$ is smaller than C2 a correction pulsewidth ΔP is provided so that a total of P(Tw)+P(C)+ΔP is generated.

Therefore, the engine rpm varies in accordance with the curves of FIG. 4 when idled. The portion of the curve designated "C" has a gradual rate of change as a function of temperature. This serves to reduce the emission of harmful waste products when the engine coolant temperature is in the neighborhood of zero degree. On the other hand, the portion designated "D" in the characteristic curves is to avoid the overheating of the engine due to the reduced air supply for the purposes of reducing the emission of harmful products. This is achieved by supplying additional air to cool the engine.

Since the amount of air taken into the manifold is measured upstream of the throttle control valve 7 and the fuel supply is controlled in response to the measured air quantity, the quantity of supplied fuel can be so controlled as to give an optimum mixture ratio under idle conditions.

As previously described, the control signal with the standard or basic pulsewidth P(Tw) for controlling valve 19 is generated as a function of engine temperature when the starter motor is being operated for cranking operation or engine rpm is below the set value of 100 rpm (steps 102, 103, FIG. 3A). Since this basic pulsewidth is experimentally determined and stored in the memory unit 22 as a fixed value, the control valve 19 is directly energized with this basic pulsewidth signal. However, if correction pulsewidth is to be added in a manner as described in connection with the other process steps to the basic pulsewidth, the computer should be so programmed that the total pulsewidth must not exceed the maximum open time of the control valve 19 if the direction of correction is positive or must not become smaller than zero open time if the direction of correction is negative.

Figures 3C, 3D:
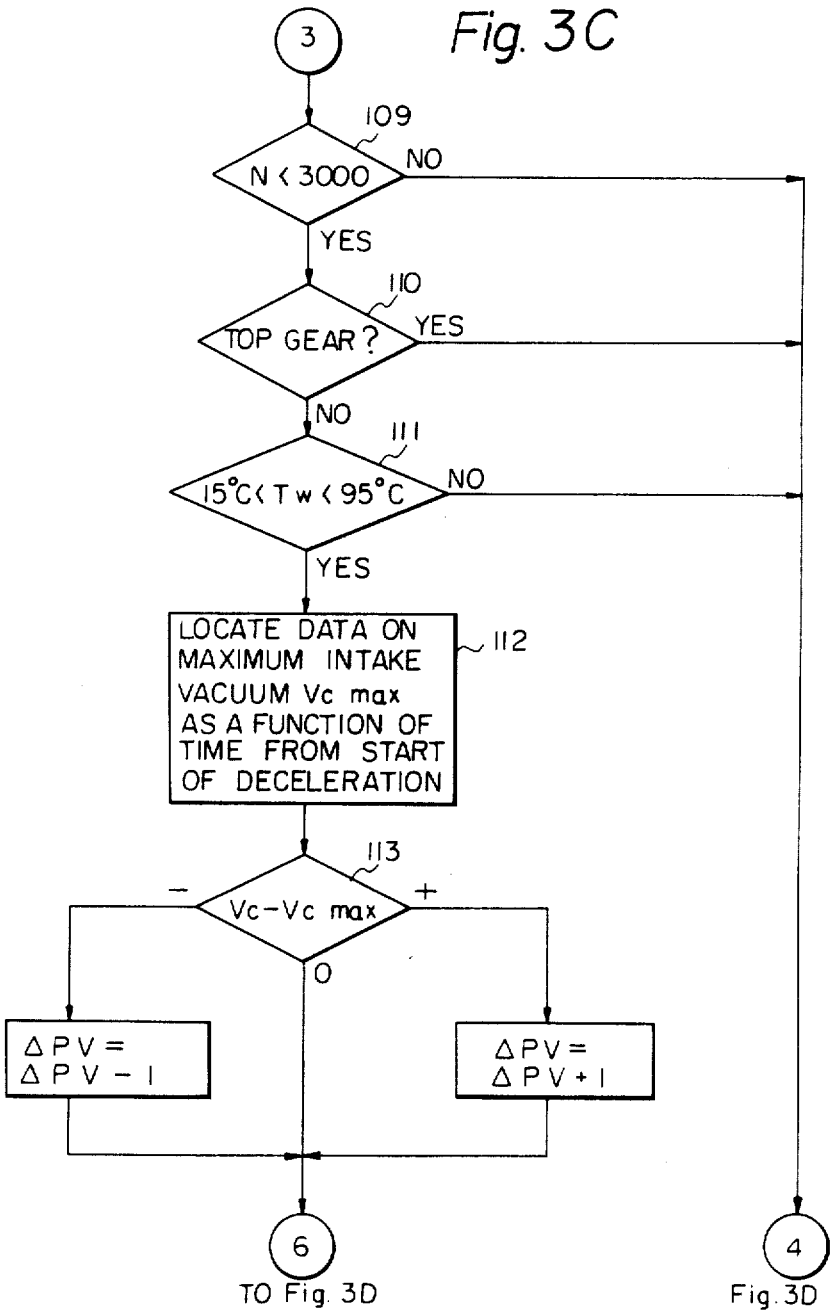
Figure 3D:
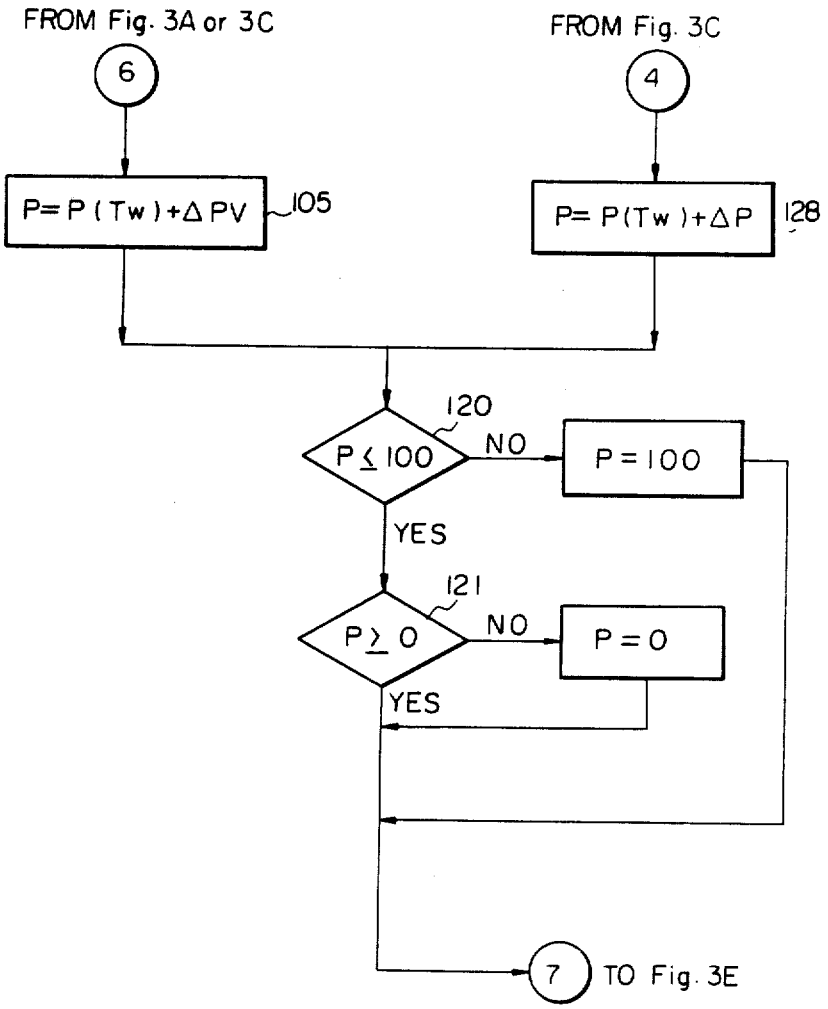

Referring to FIG. 3D, in the step 105, the basic pulsewidth P(Tw) and a correction pulsewidth ΔPV for vacuum pressure are added together. The processor now goes to check in step 120 to see if the total pulsewidth P is equal to or smaller than the 100% value corresponding to the maximum open time of the control valve 19. If the total pulsewidth is greater than 100%, the memory is so programmed that the total pulsewidth P should be set to a value corresponding to 100%. If P is smaller than 100%, the processor proceeds to step 121 to check whether the total pulsewidth is equal to or greater than zero and if not, the total pulsewidth is automatically set to a value corresponding to the zero open time. If P is greater than zero, the total pulsewidth P(Tw)+ΔPV, which is between the maximum and minimum values of the pulsewidth, is derived. The aforesaid steps also apply to limit the pulsewidth P(Tw)+ΔP which is generated when the throttle valve is open.

Figure 3E:
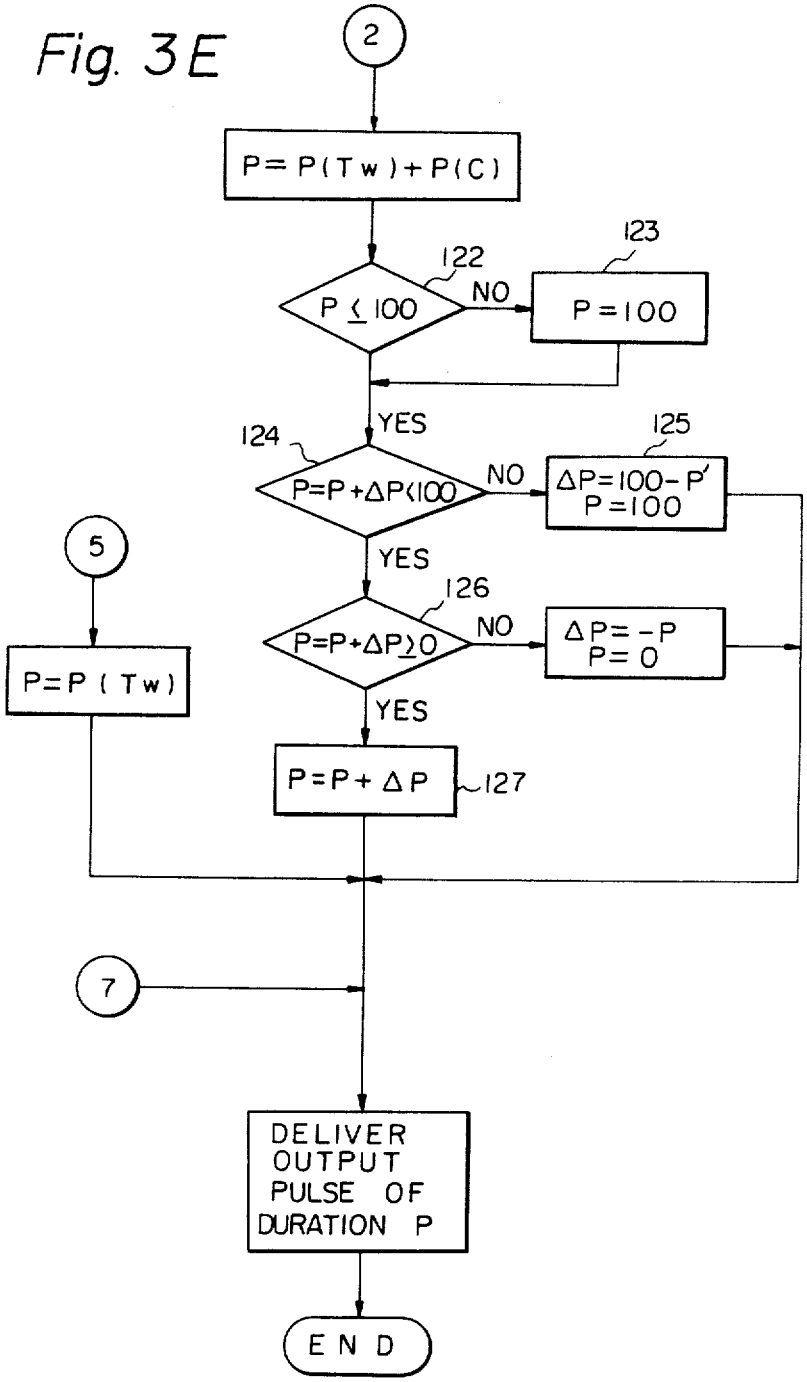

Similarly, in FIG. 3E, the total pulsewidth P′=P(Tw)+P(C) is checked in step 122 against the maximum value 100% and if greater than the maximum the total pulsewidth is limited to the 100% value in the step 123. If P′ is equal to or greater than the maximum value, the nonlimited value P′ is processed in the next step 124 as well as the value restricted in step 123 to be added up to the correction pulsewidth ΔP and compared with the maximum 100% value. If greater than the maximum, the P′+ΔP value is limited in step 125 so that P′=100 and ΔP=100—P′. If smaller than the maximum value, the total pulsewidth P is checked in step 126 to see if it is equal to or greater than zero and if greater than zero the processor recognizes it that the total pulsewidth falls within the operating range of the control valve and generate in step 127 the pulsewidth P=P(Tw)+P(C)+ΔP which is delivered to the control valve 19. If P is smaller than zero, the P value is set to zero and Δp is set to —P.

Figure 5:
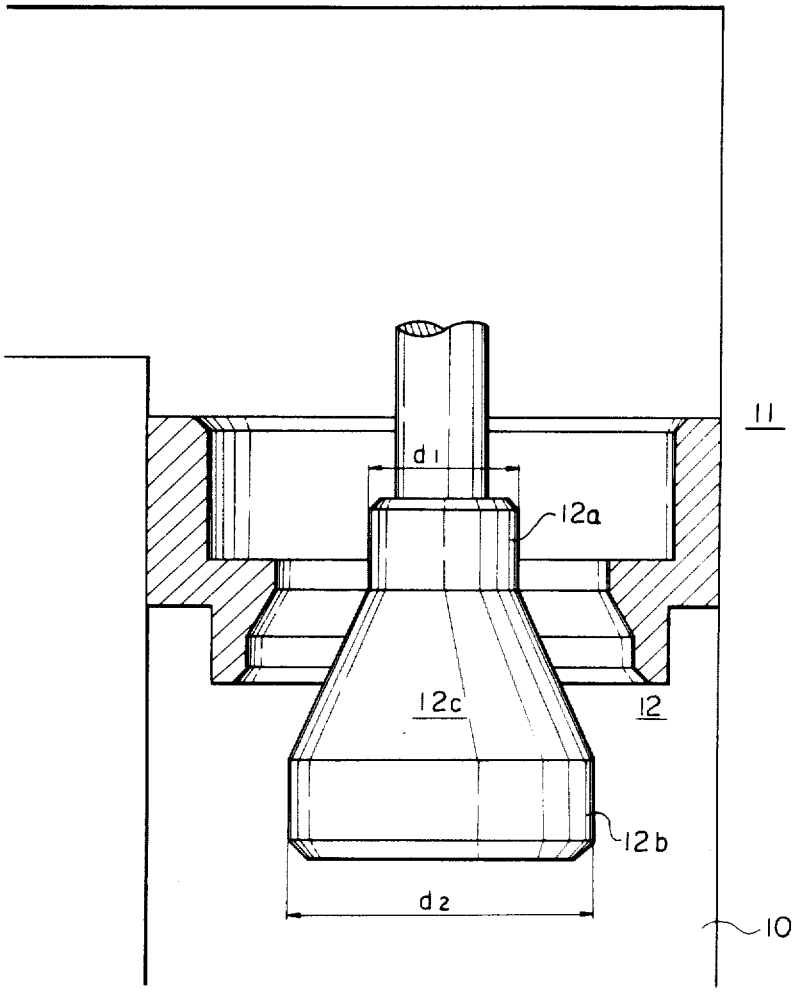
FIG. 5 is a detailed illustration of the valve member of the servo mechanism of FIG. 1.

FIG. 5 is an illustration of the detail of the control valve 11. The valve member 12 is formed into a substantially conical shape having a smaller diameter cylindrical portion 12a with a diameter $d_1$ and a larger diameter cylindrical portion 12b with a diameter $d_2$ and an intermediate or conical portion 12c. The diameter $d_1$ is so selected that the smaller diameter portion 12a defines an air gap with the orifice wall which is optimum for cold start and the diameter $d_2$ is so selected that it gives an optimum air flow for idle operation at the end of engine warm-up. The intermediate portion 12c is so designed that the rate of change in engine revolution as a function of the rate of change in control pulsewidth is rendered to be constant, as a result of which a satisfactory engine rpm control is assured in the presence of a rapid change in pulsewidth.

Because of the provision of the pressure regulator 17, the pressure in the vacuum induction passage 16 is held at a constant vacuum pressure regardless of the operating condition of the engine and since this constant vacuum pressure is diluted in the control chamber 15 by the air supplied from the pulse-operated control valve 19, the idle control valve 11 operates with a high degree of precision in response to the control signal from the microcomputer.

What is claimed is:

[1. A method for controlling an internal combustion engine having a main air intake passage for introducing air into said engine, a throttle control valve in said main air intake passage, an auxiliary air intake passage for partially passing air from an upstream side to a downstream side of said throttle control valve, a second control valve in said auxiliary passage, and a vacuum pressure sensor provided downstream of said throttle control valve, the method comprising the steps of:

detecting when the deceleration of said engine is started;

measuring the length of time from the occurrence of said deceleration;

sensing vacuum pressure downstream of said throttle control value with said vacuum pressure sensor;

generating a first binary signal representative of the vacuum pressure sensed by said vacuum pressure sensor;

generating a second binary signal representative of a reference intake vacuum pressure according to a function defining a desired relationship between said length of time and the intake vacuum pressure sensed by said vacuum pressure sensor;

comparing said first binary signal with said second binary signal to generate a control signal representative of the difference between said sensed vacuum pressure and said reference vacuum pressure; and controlling said second control valve in response to said control signal to reduce the difference between said sensed vacuum pressure and said reference vacuum pressure substantially to zero.]

[2. A method as claimed in claim 1, further comprising the steps of:

detecting the temperature of said engine;

detecting the speed of revolution of said engine;

detecting when said engine is in an idle condition;

generating in response to the detection of said idle condition a third binary signal representative of the detected speed of said engine;

generating a fourth binary signal representative of a reference idle engine speed according to a function defining a desired relationship between the detected temperature and the detected engine speed;

comparing said third binary signal with said fourth binary signal to generate a second control signal representative of the difference between said detected engine speed and said reference idle engine speed; and controlling said second control valve in response to said second control signal to reduce the difference between said detected engine speed and said reference idle engine speed substantially to zero.]

[3. A method as claimed in claim 2, wherein said internal combustion engine is equipped with a vehicle air conditioner powered by said engine, further comprising the steps of:

detecting when a vehicle is air conditioner powered by said engine is in operation;

generating in response to the detection of said air conditioner being in operation a fifth binary signal representative of a second reference idle engine speed according to a second function defining a desired relationship between the detected engine speed and the detected engine temperature;

comparing said third binary signal with said fifth binary signal to generate a third control signal representative of the difference between said second reference idle engine speed and said detected engine speed; and controlling said second control valve in response to said third control signal to reduce the difference between said second reference idle engine speed and said detected engine speed substantially to zero.]

[4. A control system for use in an internal combustion engine having a main air intake passage for introducing air to said engine, a throttle control valve in said main intake passage and an auxiliary air intake passage connected to said main intake passage for partially passing air from an upstream side to a downstream sine of the throttle control valve, comprising:

an engine deceleration detector for detecting when deceleration of said engine is started;

means for detecting intake vacuum pressure in said main intake passage downstream of said throttle control valve;

a programmed microcomputer, responsive to said deceleration detector and said vacuum pressure detecting means and operative for detecting a difference between said detected vacuum pressure and a reference vacuum pressure from a function defining a desired relationship between the length of time from the occurrence of said engine deceleration and the intake vacuum pressure in said main intake passage at the downstream side of said throttle control valve; and generating a control signal representing said difference; and means provided in said auxiliary air intake passage for controlling the air passing therethrough in response to said control signal to reduce said difference substantially to zero.]

[5. A control system as claimed in claim 4, further comprising:

means for detecting the temperature of said engine, and means for detecting the speed of revolution of said engine when said engine is idled;

said programmed microcomputer being further responsive to said temperature detecting means and said engine speed detecting means and operative for detecting a second difference between said detected engine speed and a reference idle engine speed from a second function defining a desired relationship between the detected engine temperature and the detected engine revolution speed; and generating a second control signal representing said second difference;

wherein said air controlling means is further responsive to said second control signal for controlling air passing through said auxiliary intake passage to reduce said second difference substantially to zero.]

[6. A control system as claimed in claim 5, further comprising:

means for detecting when said engine is idled;

said programmed microcomputer being further responsive to said engine idle detecting means and operative for detecting a third difference between said detected engine speed and a second reference idle engine speed which is desired when said engine delivers power to a work load during engine idle condition from a third function defining a desired relationship beween the detected engine speed and the detected engine temperature; and generating a third control signal representing said third difference;

wherein said air controlling means is further responsive to said third control signal for controlling air passing through said auxiliary intake passage to reduce said third difference substantially to zero.]

[7. A control system as claimed in claim 4, wherein said air controlling means comprises:

a first control valve having a housing, a diaphragm dividing the housing into first and second chambers, the first chamber forming part of said auxiliary air intake passage, and a valve member within said first chamber and connected to said diaphragm for movement therewith to vary the cross-section of said auxiliary passage;

means for providing fluid communication of air in said main air intake passage from the upstream to the downstream side of said throttle control valve through said second chamber of said first control valve; and a second control valve disposed in said fluid communication means for regulating the amount of air introduced into said second chamber of said first control valve in response to said control signals.]

[8. A control system as claimed in claim 7, wherein said controlling means further comprises a pressure regulator disposed in said fluid communication means between a point in said main air intake passage downstream of said throttle valve and said second chamber of said first control valve.]

[9. A control system as claimed in claims 7 or 8, wherein said second control valve is of a pulse responsive type, said control signals comprising pulses for controlling said second control valve.]

[10. A control system as claimed in claim 7 or 8, wherein said air controlling means further comprises an orifice in which said valve member of said first control valve is disposed, said valve member comprising larger and smaller diameter portions and a gradually varying diameter portion intermediate said larger and smaller diameter portions, the cross-sectional area of said smaller diameter portion defining a first air gap with said orifice in said auxiliary air intake passage crore-sponding to engine cold start condition and the cross-sectional area of said larger diameter portion defining a second air gap with said orifice corresponding to an engine idle condition which occurs at the end of engine warm-up operation.]

*11. A method for controlling an air control valve disposed in an auxiliary passage which is connected to a main intake passage of an internal combustion engine, the auxiliary passage extending between a portion upstream of a throttle valve disposed in the main intake passage and a portion downstream of the throttle valve, the internal combustion engine having means for supplying fuel thereto in response at least to the flow of air passing through the main intake passage, said method comprising the steps of:*

*detecting a vacuum within the main intake passage downstream of the throttle valve and generating a vacuum indicative signal;*

*determining that the engine is under deceleration and generating an elapsed time indicative signal indicative of time elapsed from the start of deceleration;*

*determining a maximum vacuum value for said elapsed time indicative signal and generating a maximum vacuum indicative signal, said maximum vacuum value being variable with variation of time elapsed from the start of deceleration;*

*comparing said vacuum indicative signal with said maximum vacuum indicative signal and generating a first difference indicative signal indicative of the difference between said vacuum indicative signal and said maximum vacuum indicative signal;*

*controlling the air control valve in response to said first difference indicative signal, to control the flow of air passing through the auxiliary passage to control the vacuum within the main intake passage downstream of said throttle valve so that the vacuum within the main intake passage downstream of the throttle valve becomes equal to said maximum vacuum value.*

*12. A method for controlling an air control valve disposed in an auxiliary passage which is connected to a main intake passage of an internal combustion engine, the auxiliary passage extending between a portion upstream of a throttle valve disposed in the main intake passage and a portion downstream of the throttle valve, the internal combustion engine having means for supplying fuel thereto in response at least to the flow of air passing through the main intake passage, said method comprising the steps of:*

*detecting a vacuum within the main intake passage downstream of the throttle valve and generating a vacuum indicative signal;*

*determining that the engine is under deceleration and generating an elapsed time indicative signal indicative of time elapsed from the start of deceleration;*

*determining a maximum vacuum value for said elapsed time indicative signal and generating a maximum vacuum indicative signal, said maximum vacuum value being variable with variation of time elapsed from the start of deceleration;*

*comparing said vacuum indicative signal with said maximum vacuum indicative signal and generating a first difference indicative signal indicative of the difference between said vacuum indicative signal and said maximum vacuum indicative signal;*

*detecting an engine temperature of the engine and generating a temperature indicative signal;*

*determining that the engine is idling and generating an idling indicative signal;*

*detecting in response to said idling indicative signal an idling revolution speed of the engine and generating an idling revolution speed indicative signal;*

*determining in response to said idling indicative signal a first optimum idling revolution speed value for said temperature indicative signal and generating a first optimum idling revolution speed value indicative signal, said first optimum idling revolution speed value being variable with a variation of the engine temperature of the engine;*

*comparing said idling revolution speed indicative signal with said first optimum revolution speed indicative signal and generating a second difference indicative signal indicative of the difference between said idling revolution speed indicative signal and said first optimum idling revolution speed value indicative signal;*

*controlling, in response to the presence of said elapsed time indicative signal, the air control valve in response to said first difference indicative signal, to control the flow of air passing through the auxiliary passage to control the vacuum within the main intake passage downstream of said throttle valve so that the vacuum within the main intake passage downstream of the throttle valve becomes substantially equal to said maximum vacuum value; and*

*controlling, in response to the presence of said idling indicative signal, the air control valve in response to said second difference indicative signal to control the flow of air passing through the auxiliary passage so that the idling revolution speed of the engine becomes substantially equal to said first optimum idling revolution speed value.*

*13. A method for controlling an air control valve disposed in an auxiliary passage which is connected to a main intake passage of an internal combustion engine, the auxiliary passage extending between a portion upstream of a throttle valve disposed in the main intake passage and a portion downstream of the throttle valve, the internal combustion engine having means for supplying fuel thereto in response at least to the flow of air passing through the main intake passage, the engine being equipped with an air conditioner which, when in operation, becomes a load of the engine, said method comprising the steps of:*

*detecting a vacuum within the main intake passage downstream of the throttle valve and generating a vacuum indicative signal;*

*determining that the engine is under deceleration and generating an elapsed time indicative signal indicative of time elapsed from the start of deceleration;*

*determining a maximum vacuum value for said elapsed time indicative signal and generating a maximum vacuum indicative signal, said maximum vacuum value being variable with variation of time elapsed from the start of deceleration;*

*comparing said vacuum indicative signal with said maximum vacuum indicative signal and generating a first difference indicative signal indicative of the differene between said vacuum indicative signal and said maximum vacuum indicative signal;*

*detecting an engine temperature of the engine and generating a temperature indicative signal;*

*determining that the engine is idling and generating an idling indicative signal;*

*detecting in response to said idling indicative signal an idling revolution speed of the engine and generating an idling revolution speed indicative signal;*

*determining in response to said idling indicative signal a first optimum idling revolution speed value for said temperature indicative signal and generating a first optimum idling revolution speed value indicative signal, said first optimum idling revolution speed value being variable with a variation of the engine temperature of the engine;*

*comparing said idling revolution speed indicative signal with said first optimum revolution speed indicative signal and generating a second difference indicative signal indicative of the difference between said idling revolution speed indicative signal and said first optimum idling revolution speed value indicative signal;*

*detecting whether the air conditioner is being operated and generating an air conditioner operation indicative signal when the air conditioner is being operated;*

*determining in response to said air conditioner operation indicative signal a second optimum idling revolution speed value for said temperature indicative signal and generating a second optimum idling revolution speed value indicative signal, said second optimum idling*

*revolution speed value being at least higher than said optimum idling revolution speed value;*

*comparing said idling revolution speed indicative signal with said second optimum idling revolution speed value indicative signal and generating a third difference indicative signal indicative of the difference between said idling revolution speed indicative signal and said second idling revolution speed value indicative signal;*

*controlling, in response to the presence of said elapsed time indicative signal, the air control valve in response to said first difference indicative signal to control the vacuum within the main intake passage downstream of said throttle valve so that the vacuum within the main intake passage downstream of the throttle valve becomes substantially equal to said maximum vacuum value;*

*controlling, in response to the presence of said idling indicative signal and the absence of said air conditioner operation indicative signal, the air control valve in response to said second difference indicative signal to control the flow of air passing through the auxiliary passage so that the idling revolution of the engine become substantially equal to said first optimum idling revolution speed value; and*

*controlling, in response to the presence of said idling indicative signal and the presence of said air conditioner operation indicative signal, the air control valve in response to said third difference indicative signal to control the flow of air passing through the auxiliary passage so that the idling revolution speed of the engine becomes substantially equal to said second optimum idling revolution speed value.*

*14. A control system for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, said control system comprising:*

*means for detecting a vacuum within the main intake passage downstream of the throttle valve and generating a vacuum indicative signal;*

*a microcomputer including a memory which stores maximum vacuum values for time elapsed from the start of deceleration, and a central processor unit,*

*said central processor unit determining that the engine is under deceleration and generating an elapsed time indicative signal indicative of time elapsed from the start of deceleration, determining one maximum vacuum value from said stored maximum vacuum values for said elapsed time indicative signal and generating a maximum vacuum value indicative signal, and comparing said vacuum indicative signal with said maximum vacuum value indicative signal and generating a first difference indicative signal indicative of the difference between said vacuum indicative signal and said maximum vacuum value indicative signal; and*

*means for controlling the air control valve in response to said first difference indicative value to control the flow of air passing through the auxiliary passage to control the vacuum within the main intake passage downstream of said throttle valve so that the vacuum within the main intake passage downstream of the throttle valve becomes equal to said maximum vacuum value.*

*15. A control system for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, said control system comprising:*

*means for detecting a vacuum within the main intake passage downstream of the throttle valve and generating a vacuum indicative signal;*

*a microcomputer including a memory which stores maximum vacuum values for time elapsed from the start of deceleration, and a central processor unit,*

*said central processor unit determining that the engine is under deceleration and generating an elapsed time indicative signal indicative of time elapsed from the start of deceleration, determining one maximum vacuum value from said stored maximum vacuum values for said elapsed time indicative signal and generating a maximum vacuum value indicative signal, and comparing said vacuum indicative signal with said maximum vacuum value indicative signal and generating a first difference indicative signal indicative of the difference between said vacuum indicative signal and said maximum vacuum value indicative signal;*

*means for detecting an engine temperature of the engine and generating a temperature indicative signal;*

*means for detecting the revolution speed of the engine and generating an engine revolution speed indicative signal;*

*said memory storing optimum idling revolution speed values, each for an engine temperature value indicated by said temperature indicative signal;*

*said central processor unit determining that the engine is idling to generate an idling indicative signal, determining one optimum idling revolution speed from said optimum idling revolution speed values for said temperature indicative signal to generate an optimum idling revolution speed value indicative signal, and comparing said engine revolution speed indicative signal with said optimum revolution speed value indicative signal to generate a second difference indicative signal indicative of the difference between said engine revolution speed indicative signal and said optimum idling revolution speed value indicative signal;*

*means for controlling, in response to the presence of said elapsed time indicative signal, the air control valve in response to said first difference indicative signal to control the flow of air passing through the auxiliary passage to control the vacuum within the main intake passage downstream of said throttle valve so that the vacuum within the main intake passage downstream of the throttle valve becomes substantially equal to said maximum vacuum value;*

*said controlling means controlling, in response to the presence of said idling indicative signal, the air control valve in response to said second difference indicative signal to control the flow of air passing through the auxiliary passage so that the idling revolution speed of the engine becomes substantially equal to said first optimum idling revolution speed value.*

*16. A control system for controlling an air control valve disposed in an auxiliary passage which is connected to a main intake passage of an internal combustion engine, said auxiliary passage extending between a portion upstream of a throttle valve disposed in the main intake passage and a*

*portion downstream of the throttle valve, the internal combustion engine having means for supplying fuel thereto in response at least to the flow of air passing through the main intake passage, the engine being equipped with an air conditioner which, when in operation, becomes a load of the engine, said control system comprising:*

*means for detecting a vacuum within the main intake passage downstream of the throttle valve and generating a vacuum indicative signal;*

*a microcomputer including a memory which stores maximum vacuum values for time elapsed from the start of deceleration, and a central processor unit,*

*said central processor unit determining that the engine is under deceleration and generating an elapsed time indicative signal indicative of time elapsed from the start of deceleration, determining one maximum vacuum value from said stored maximum vacuum values for said elapsed time indicative signal and generating a maximum vacuum value indicative signal, and comparing said vacuum indicative signal with said maximum vacuum value indicative signal and generating a first difference indicative signal indicative of the difference between said vacuum indicative signal and said maximum vacuum value indicative signal;*

*means for detecting an engine temperature of the engine and generating a temperature indicative signal;*

*means for detecting a revolution speed of the engine and generating an engine revolution speed indicative signal;*

*said memory storing first optimum idling revolution speed values, each for an engine temperature value indicated by said temperature indicative signal;*

*said central processor unit determining that the engine is idling to generate an idling indicative signal, determining one first optimum idling revolution speed from said first optimum idling revolution speed values for said temperature indicative signal to generate a first optimum idling revolution speed value indicative signal, and comparing said engine revolution speed indicative signal with said first optimum revolution speed value indicative signal to generate a second difference indicative signal indicative of the difference between said engine revolution speed indicative signal and said first optimum idling revolution speed value indicative signal;*

*said memory storing second optimum idling revolution values, each for an engine temperature value indicated by said temperature indicative signal;*

*said central processor unit determining that the air conditioner is operated to generate an air conditioner operation indicative signal, determining one second optimum idling revolution speed value from said stored second optimum idling revolution speed values for said temperature indicative signal to generate a second optimum idling revolution speed value indicative signal, comparing said engine revolution speed indicative signal with said second optimum idling revolution speed value indicative signal to generate a third difference indicative signal indicative of the difference between said engine revolution speed indicative signal and said second optimum idling revolution speed value indicative signal,*

*means for controlling, in response to the presence of said elapsed time indicative signal, the air control valve in response to said first difference indicative signal to control the flow of air passing through the auxiliary passage to control the vacuum within the main intake passage downstream of said throttle valve so that the vacuum within the main intake passage downstream of the throttle valve becomes substantially equal to said maximum vacuum value;*

*said controlling means controlling, in response to the presence of said idling indicative signal and the absence of said air conditioner operation indicative signal, the air control valve in response to said second difference indicative signal to control the flow of air passing through the auxiliary passage so that the idling revolution speed of the engine becomes substantially equal to said first optimum idling revolution speed value;*

*said controlling means controlling, in response to the presence of said idling indicative signal and the presence of said air conditioner operation indicative signal, the air control valve in response to said third difference indicative signal to control the flow of air passing through the auxiliary passage so that the engine revolution speed of the engine becomes substantially equal to said second optimum idling revolution speed value.*

*17. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, the engine being equipped with a device which, when in operation, becomes a load of the engine, said method comprising the steps of:*

*detecting a temperature of the engine and generating a temperature indicative signal;*

*detecting an idling revolution speed of the engine and generating an idling revolution speed indicative signal;*

*detecting whether the device is being operated and generating device operation indicative signal when the device is being operated;*

*determining in response to the absence of said device operation indicative signal a first optimum idling revolution speed indicative signal for said temperature indicative signal and generating a first optimum idling revolution speed value being variable with a variation of the temperature of the engine.*

*determining in response to the presence of said device operation indicative signal a second optimum idling revolution speed value for said temperature indicative signal and generating a second optimum idling revolution speed value indicative signal, said second optimum idling revolution speed value being at least higher than said optimum idling revolution speed value and variable with a variation of the temperature of the engine;*

*comparing, in response to the absence of said device operation indicative signal, said idling revolution speed indicative signal with said first optimum revolution speed value indicative signal and generating a first difference indicative signal indicative of the difference between said idling revolution speed indicative signal and said first optimum idling revolution speed value indicative signal;*

*comparing, in response to the presence of said device operation indicative signal, said idling revolution speed indicative signal with said second optimum idling revolution speed value indicative signal and generating a second difference indicative signal indicative of the difference between said idling revolution*

*speed indicative signal and said second optimum idling revolution speed value indicative signal;*

*controlling, in response to the absence of said device operation indicative signal, the air control valve in response to said first difference indicative signal so that the idling revolution speed of the engine becomes equal to said first optimum idling revolution speed value; and*

*controlling, in response to the presence of said device operation indicative signal, the air control valve in response to said second difference indicative signal, to control the flow of air passing through the auxiliary passage so that the idling revolution speed of the engine becomes equal to said second optimum idling revolution speed value.*

*18. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, the engine being equipped with a device which, when in operation, becomes a load of the engine, said method comprising the steps of:*

*detecting a temperature of the engine and generating a temperature indicative signal;*

*detecting an idling revolution speed of the engine and generating an idling revolution speed indicative signal;*

*detecting whether the device is being operated and generating a device operation indicative signal when the device is being operated;*

*determining in response to the absence of said device operation indicative signal a first optimum idling revolution speed indicative signal and generating a first optimum idling revolution speed value indicative signal, said first optimum idling revolution speed value being variable with a variation of the temperature of the engine;*

*determining in response to the presence of said device operation indicative signal a second optimum idling revolution speed value for said temperature indicative signal and generating a second optimum idling revolution speed value indicative signal, said second optimum idling revolution speed value being at least higher than said optimum idling revolution speed value and being variable with a variation of the temperature of the engine;*

*comparing, in response to the absence of said device operation indicative signal, said idling revolution speed indicative signal with said first optimum revolution speed value indicative signal and generating a first difference indicative signal indicative of the difference between said idling revolution speed indicative signal and said first optimum idling revolution speed value indicative signal;*

*comparing, in response to the presence of said device operation indicative signal, said idling revolution speed indicative signal with said second optimum idling revolution speed value indicative signal and generating a second difference indicative signal indicative of the difference between said idling revolution speed indicative signal and said second optimum idling revolution speed value indicative signal;*

*controlling, in response to the absence of said device operation indicative signal, the air control valve in response to said first difference indicative signal to control the flow of air passing through the auxiliary passage only when the difference indicated by said first difference indicative signal continues to be greater than a predetermined value for a predetermined duration of time so that the idling revolution speed of the engine becomes equal to said first optimum idling revolution speed value; and*

*controlling, in response to the presence of said device operation indicative signal, the air control valve in response to said second difference indicative signal, to control the flow of air passing through the auxiliary passage only when the difference indicated by said second difference indicative signal continues to be greater than said predetermined value for said predetermined duration of time so that the idling revolution speed of the engine becomes equal to said second optimum idling revolution speed value.*

*19. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, the engine being equipped with an air conditioner which, when in operation, becomes a load of the engine, said method comprising the steps of:*

*detecting a temperature of the engine and generating a temperature indicative signal;*

*detecting in response to said idling indicative signal an idling revolution speed of the engine and generating an idling revolution speed indicative signal;*

*detecting whether the air conditioner is being operated and generating an air conditioner operation indicative signal when the air conditioner is being operated;*

*determining in response to the absence of said air conditioner operation indicative signal a first optimum idling revolution speed indicative signal for said temperature indicative signal and generating a first optimum idling revolution speed value indicative signal, said first optimum idling revolution speed value being variable with a variation of the temperature of the engine;*

*determining in response to the presence of said air conditioner operation indicative signal and a second optimum idling revolution speed value for said temperature indicative signal and generating a second optimum idling revolution speed value indicative signal; said second optimum idling revolution speed value being at least higher than said optimum idling revolution speed value;*

*comparing, in response to the absence of said air conditioner operation indicative signal, said idling revolution speed indicative signal with said first optimum revolution speed value indicative signal and generating a first difference indicative signal indicative of the difference between said idling revolution speed indicative signal and said first optimum idling revolution speed value indicative signal;*

*comparing, in response to the presence of said air conditioner operation indicative signal, said idling revolution speed indicative signal with said second optimum idling revolution speed value indicative signal and generating a second difference indicative signal indicative of the difference between said idling revolution speed indicative signal and said second optimum idling revolution speed value indicative signal;*

*controlling, in response to the absence of said air conditioner operation indicative signal, the air control valve in response to said first difference indicative signal to control the flow of air passing through the auxiliary passage only so that the idling revolution speed of the engine becomes equal to said first optimum idling revolution speed value; and*

*controlling, in response to the presence of said air conditioner operation indicative signal, the air control valve in response to said second difference indicative signal, to control the flow of air passing through the auxiliary passage so that the idling revolution speed of the engine becomes equal to said second optimum idling revolution speed value.*

*20. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, the engine being equipped with an air conditioner which, when in operation, becomes a load of the engine, said method comprising the steps of:*

*detecting a temperature of the engine and generating a temperature indicative signal;*

*determining that the engine is idling and generating an idling indicative signal;*

*detecting in response to said idling indicative signal an idling revolution speed of the engine and generating an idling revolution speed indicative signal;* detecting that the air conditioner is operated and generating a air conditioner operation indicative signal;

*determining in response to the absence of said air conditioner operation indicative signal a first optimum idling revolution speed indicative signal for said temperature indicative signal and generating a first optimum idling revolution speed value indicative signal, said first optimum idling revolution speed value being variable with a variation of the temperature of the engine;*

*determining in response to the presence of said air conditioner operation indicative signal a second optimum idling revolution speed value for said temperature indicative signal and generating a second optimum idling revolution speed value indicative signal, said second optimum idling revolution speed value being at least higher than said optimum idling revolution speed value;*

*comparing, in response to the absence of said air conditioner operation indicative signal, said idling revolution speed indicative signal with said first optimum revolution speed value indicative signal and generating a first difference indicative signal indicative of the difference between said idling revolution speed indicative signal and said first optimum idling revolution speed value indicative signal;*

*comparing, in response to the presence of said air conditioner operation indicative signal, said idling revolution speed indicative signal with said second optimum idling revolution speed value indicative signal and generating a second difference indicative signal indicative of the difference between said idling revolution speed indicative signal and said second optimum idling revolution speed value indicative signal;*

*controlling, in response to the absence of said air conditioner operation indicative signal, the air control valve in response to said first difference indicative signal only when the difference indicated by said first difference indicative signal continues to be greater than a predetermined value for a predetermined duration of time to control the flow of air passing through the auxiliary passage so that the idling revolution speed of the engine becomes equal to said first optimum idling revolution speed value; and*

*controlling, in response to the presence of said air conditioner operation indicative signal, the air control valve in response to said second control signal only when the difference indicated by said second difference indicative signal continues to be greater than said predetermined value for said predetermined duration of time to control the flow of air passing through the auxiliary passage so that the idling revolution speed of the engine becomes equal to said second optimum idling revolution speed value.*

*21. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, the internal combustion engine being drivingly connected to a transmission, the engine being equipped with an air conditioner which, when in operation, becomes a load of the engine, said method comprising the steps of:*

*detecting a temperature of the engine and generating a temperature indicative signal;*

*detecting a revolution speed of the engine and generating an engine revolution speed indicative signal;*

*detecting a throttle position of a throttle valve and generating a throttle position indicative signal when the throttle valve is closed;*

*detecting a vehicle speed of the vehicle and generating a vehicle speed indicative signal when the vehicle speed is lower than a predetermined value;*

*detecting the state of the transmission and generating a neutral state indicative signal when the transmission is in the neutral state;*

*determining that the engine is idling when said throttle position indicative signal is present and said vehicle speed indicative signal is absent or when said throttle position indicative signal is present and said vehicle speed indicative signal is absent and said neutral state indicative signal is absent and generating an idling indicative signal;*

*detecting that the air conditioner is operated and generating an air conditioner operation indicative signal;*

*determining in response to the presence of said idling indicative signal and the absence of said air conditioner operation indicative signal a first optimum idling revolution speed value for said temperature indicative signal and generating a first optimum idling revolution speed value indicative signal, said first optimum idling revolution speed value being variable with a variation of the temperature of the engine.*

*determining in response to the presence of said idling indicative signal and the presence of said air conditioner operation indicative signal a second optimum idling revolution speed value for said temperature*

*indicative signal and generating a second optimum idling revolution speed value indicative signal, said second optimum idling revolution speed value being at least higher than said first optimum idling revolution speed value and being variable with variation of the temperature of the engine;*

*comparing, in response to the presence of said idling signal, and the absence of said air conditioner operation indicative signal, said engine revolution speed indicative signal with said first optimum revolution speed value indicative signal and generating a first difference indicative signal indicative of the difference between said engine revolution speed indicative signal and said first optimum idling revolution speed value indicative signal;*

*comparing, in response to the presence of said idling indicative signal and the presence of said air conditioner operation indicative signal, said engine revolution speed indicative signal with said second optimum idling revolution speed value indicative signal and generating a second difference indicative signal indicative of the difference between said engine revolution speed indicative signal and said second optimum idling revolution speed value indicative signal;*

*controlling, in response to the absence of said idling indicative signal and the absence of said air conditioner operation indicative signal, the air control valve in response to said first difference indicative signal to control the flow of air passing through the auxiliary passage to control air fuel mixture in the main intake passage downstream of the throttle valve so that the idling revolution speed of the engine becomes equal to said first optimum idling revolution speed value; and*

*controlling, in response to the presence of said idling indicative signal and the presence of said air conditioner operation indicative signal, the air control valve in response to said second difference indicative signal, to control the flow of air passing through the auxiliary passage to control air fuel mixture in the main intake passage downstream of the main intake passage so that the idling revolution speed of the engine becomes equal to said second optimum idling revolution speed value.*

*22. A control system for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, the engine being equipped with an air conditioner which, when in operation, becomes a load of the engine, the engine being drivingly connected to a transmission, said control system comprising:*

*means for detecting a temperature of the engine and generating a temperature indicative signal;*

*means for detecting a revolution speed of the engine and generating an engine revolution speed indicative signal;*

*means for detecting a throttle position of a throttle valve and generating a throttle position indicative signal when the throttle valve is closed;*

*means for detecting a vehicle speed of the vehicle and generating a vehicle speed indicative signal when the vehicle speed is lower than a predetermined value;*

*means for detecting a neutral state of the transmission and generating a neutral state indicative signal when the transmission is in the neutral state;*

*means for detecting that the air conditioner is operated and generating an air conditioner operation indicative signal;*

*a microcomputer including a memory storing a plurality pairs of optimum idling revolution speed values, each paid being for a temperature value indicated by said temperature indicative signal and comprising a first optimum idling revolution speed value and a second optimum idling revolution speed value, said second optimum idling revolution speed value being lower than said first optimum idling revolution speed value;*

*said central process unit determining that the engine is idling when said throttle position indicative signal is present and said vehicle speed indicative signal is present or when the said throttle position indicative signal is present and said neutral state indicative signal is present to generate an idling indicative signal, in resonse to the presence of said idling indicative signal and the absence of said air conditioner operation indicative signal determining one of said first optimum idling revolution speed values for said temperature indicative signal to generate a first optimum idling revolution speed value indicative signal, in response to the presence of said idling indicative signal and the presence of said air conditioner indicative signal determining one of said second optimum idling revolution speed values for said temperature indicative signal to generate a second optimum idling revolution speed value indicative signal, said second optimum idling revolution speed value being at least higher than said first optimum idling revolution speed value, comparing, in response to the presence of said air conditioner operation indicative signal with said first optimum revolution speed value indicative signal and generating a first difference indicative signal indicative of the difference between said engine revolution speed indicative signal and said first optimum idling revolution speed value indicative signal, comparing, in response to the presence of said idling indicative signal and the presence of said air conditioner operation indicative signal, said engine revolution speed indicative signal with said second optimum idling revolution speed value indicative signal and generating a second difference indicative signal indicative of the difference between said engine revolution speed indicative signal and said second optimum idling revolution speed value indicative signal; and*

*means for controlling, in response to the presence of said idling indicative signal and the absence of said air conditioner operation indicative signal, the air control valve in response to said first difference indicative signal to control the flow of air passing through the auxiliary passage to control air fuel mixture in the main intake passage downtream of the throttle valve so that the idling revolution speed of the engine becomes equal to said first optimum idling revolution speed value, said controlling means controlling, in response to the presence of said idling indicative signal and the presence of said air conditioner operation indicative signal, the air control valve, in response to said second difference indicative signal, to control the flow of air passing through the auxiliary passage so that the idling revolution speed of the engine becomes*

*equal to said second optimum idling revolution speed value.*

*23. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, said method comprising the steps of:*

*detecting a temperature of the engine and generating a temperature indicative signal;*

*detecting an idling revolution speed of the engine and generating an idling revolution speed indicative signal;*

*determining an optimum idling revolution speed value for said temperature indicative signal which is variable with a variation of the temperature of the engine and generating an optimum idling revolution speed value indicative signal;*

*comparing said idling revolution speed indicative signal with said optimum idling revolution speed value indicative signal and generating a first comparison result indicative signal when said idling revolution speed indicative signal is greater than said optimum idling revolution speed value indicative signal by a predetermined value, a second comparison result indicative signal when said idling revolution speed indicative signal is less than said optimum idling revolution speed value indicative signal by said predetermined value, and a third comparison result indicative signal when said idling revolution speed indicative signal is not greater than said optimum idling revolution speed value indicative signal by said predetermined value and not less than said optimum idling revolution speed value indicative signal by said predetermined value;*

*controlling the air control valve to decrease the flow of air passing through the main intake passage in response to said first comparison result indicative signal thereby to decrease the idling revolution speed of the engine;*

*controlling the air control valve to increase the flow of air passing through the main intake passage in response to said second comparison result indicative signal thereby to increase the idling revolution speed of the engine; and*

*maintaining opening degree of the air control valve as it is in response to said third comparison result indicative signal.*

*24. A method for controlling an air control valve disposed in an auxiliary passage which is connected to a main intake passage of an internal combustion engine, said auxiliary passage extending between a portion upstream of a throttle valve disposed in the main intake passage and a portion downstream of the throttle valve, the internal combustion engine having means for supplying fuel thereto in response at least to the flow of air passing through the main intake passage, said method comprising the steps of:*

*detecting a temperature of the engine and generating a temperature indicative signal;*

*detecting an idling revolution speed of the engine and generating an idling revolution speed indicative signal;*

*determining an optimum idling revolution speed for said temperature which is variable with a variation of the engine temperature of the engine and generating an optimum idling revolution speed value indicative signal;*

*computing a difference between said idling revolution speed indicative signal and said optimum idling revolution speed value indicative signal and generating a difference indicative signal;*

*comparing said difference indicative signal with a predetermined value and generating a first comparison result indicative signal when said difference indicative signal is greater than said predetermined value and a second comparison result signal when said difference indicative signal is not greater than said predetermined value;*

*controlling the air control valve in response to said difference indicative signal when said first comparison result indicative signal is present; and*

*maintaining opening degree of the air control valve as it is when said second comparison result indicative signal is present.*

* * * * *